United States Patent
Sainanee et al.

(10) Patent No.: US 11,100,106 B1
(45) Date of Patent: Aug. 24, 2021

(54) QUERY ENGINE VIRTUALIZATION

(71) Applicant: Amazon Technologies, Inc., Seattle, WA (US)

(72) Inventors: Archak Sainanee, Seattle, WA (US); Ratnakar Choudhary, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 414 days.

(21) Appl. No.: 16/104,027

(22) Filed: Aug. 16, 2018

(51) Int. Cl.
*G06F 16/2453* (2019.01)
*G06F 16/2458* (2019.01)
*G06F 16/248* (2019.01)

(52) U.S. Cl.
CPC ...... *G06F 16/24545* (2019.01); *G06F 16/248* (2019.01); *G06F 16/2453* (2019.01); *G06F 16/2471* (2019.01)

(58) Field of Classification Search
CPC ............... G06F 16/248; G06F 16/2471; G06F 16/24545; G06F 16/2453
USPC .................................. 707/706, 718, 769, 707
See application file for complete search history.

(56) References Cited

U.S. PATENT DOCUMENTS

| | | | | |
|---|---|---|---|---|
| 7,457,835 | B2 * | 11/2008 | Toebes | H04L 67/1095 |
| | | | | 707/999.204 |
| 7,930,286 | B2 * | 4/2011 | Sue | G06F 16/951 |
| | | | | 707/706 |
| 7,983,963 | B2 * | 7/2011 | Byrne | G06Q 30/0623 |
| | | | | 705/27.2 |
| 8,392,392 | B1 * | 3/2013 | Ruf | G06F 16/951 |
| | | | | 707/706 |
| 10,713,248 | B2 * | 7/2020 | Gerweck | G06F 16/2457 |
| 2004/0128282 | A1 * | 7/2004 | Kleinberger | G06F 16/9535 |
| | | | | 707/999.003 |
| 2006/0206621 | A1 * | 9/2006 | Toebes | G06F 16/27 |
| | | | | 709/238 |
| 2008/0201304 | A1 * | 8/2008 | Sue | G06F 16/338 |
| | | | | 707/999.003 |
| 2008/0281810 | A1 * | 11/2008 | Smyth | G06F 16/951 |
| | | | | 707/999.005 |
| 2009/0171813 | A1 * | 7/2009 | Byrne | G06F 16/9535 |
| | | | | 705/26.1 |
| 2013/0086039 | A1 * | 4/2013 | Salch | G06F 16/183 |
| | | | | 707/717 |
| 2019/0026335 | A1 * | 1/2019 | Gerweck | G06F 16/24578 |

* cited by examiner

*Primary Examiner* — Phong H Nguyen
(74) *Attorney, Agent, or Firm* — Nicholson De Vos Webster & Elliott LLP

(57) ABSTRACT

Techniques for query engine virtualization are described. A query engine virtualization layer between clients and multiple query engines acts as a proxy to execute queries on behalf of the clients using ones of the multiple query engines selected for each query that are comparatively the best-suited to execute the query. The selection may be based on the workload pattern the query is issuing on the underlying data.

20 Claims, 11 Drawing Sheets

```
GetExecutionEstimate Request
{
  "id":          "random uint64",
  "customer_id": "string",
  "query":       "string"
}
```

400

```
GetExecutionEstimate Response
{
  "id":             "random uint64",
  "data_scanned":   "string",
  "execution_time": number,
  "largest_op":     "string",
  "cost":           number
}
```

QUERY ENGINE VIRTUALIZATION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which:

FIG. 4 is a diagram illustrating exemplary GetExecutionEstimate request and response formats according to some embodiments.

DETAILED DESCRIPTION

Various embodiments of methods, apparatus, systems, and non-transitory computer-readable storage media for query engine virtualization are described. According to some embodiments, multiple types of query engines are "virtualized" behind a common interface to clients by a query virtualization service, allowing the query virtualization service to select and utilize the most "optimal" query engine to execute a particular query, recommend particular query engines for the user, and/or translate queries from one language definition to another language definition for use with different types of query engines. Accordingly, embodiments remove the need for query engine users to fine tune queries for the sake of performance, or have an extremely detailed understanding of a variety of query engine types, their corresponding architectures, strengths and weaknesses, the nature of the particular query, the nature of the layout of the involved data, etc. Additionally, some embodiments can utilize or recommend the use of different query engines based on real-time system performance characteristics of the query engines, previous performance of queries having similar characteristics, etc.

As discussed herein, a query service (or "query processing service") may be a data service that can execute user-provided queries against data stored by (or accessible to) the data service. A query service could be, for example, a "traditional" relational database management system (e.g., MySQL, MariaDB, PostgreSQL, H2, Microsoft SQL Server, Oracle, etc.), a NoSQL database, an object database management system, an object-relational database system, a data warehouse system (e.g., Amazon Redshift), a "serverless" interactive query service (e.g., Amazon Athena), a distributed "Big Data" processing system (e.g., Apache Spark), etc. Many of these query services can be queried using a query written in one or more query languages (as defined by a query language definition), such as one or more of the many dialects, extensions, and implementations of Structured Query Language (SQL), such as Transact-SQL (T-SQL), Procedural Language/SQL (PL/SQL), PL/pgSQL (Procedural Language/PostgreSQL), SQL-86, SQL-92, SQL:2016, etc.

Figure 1:
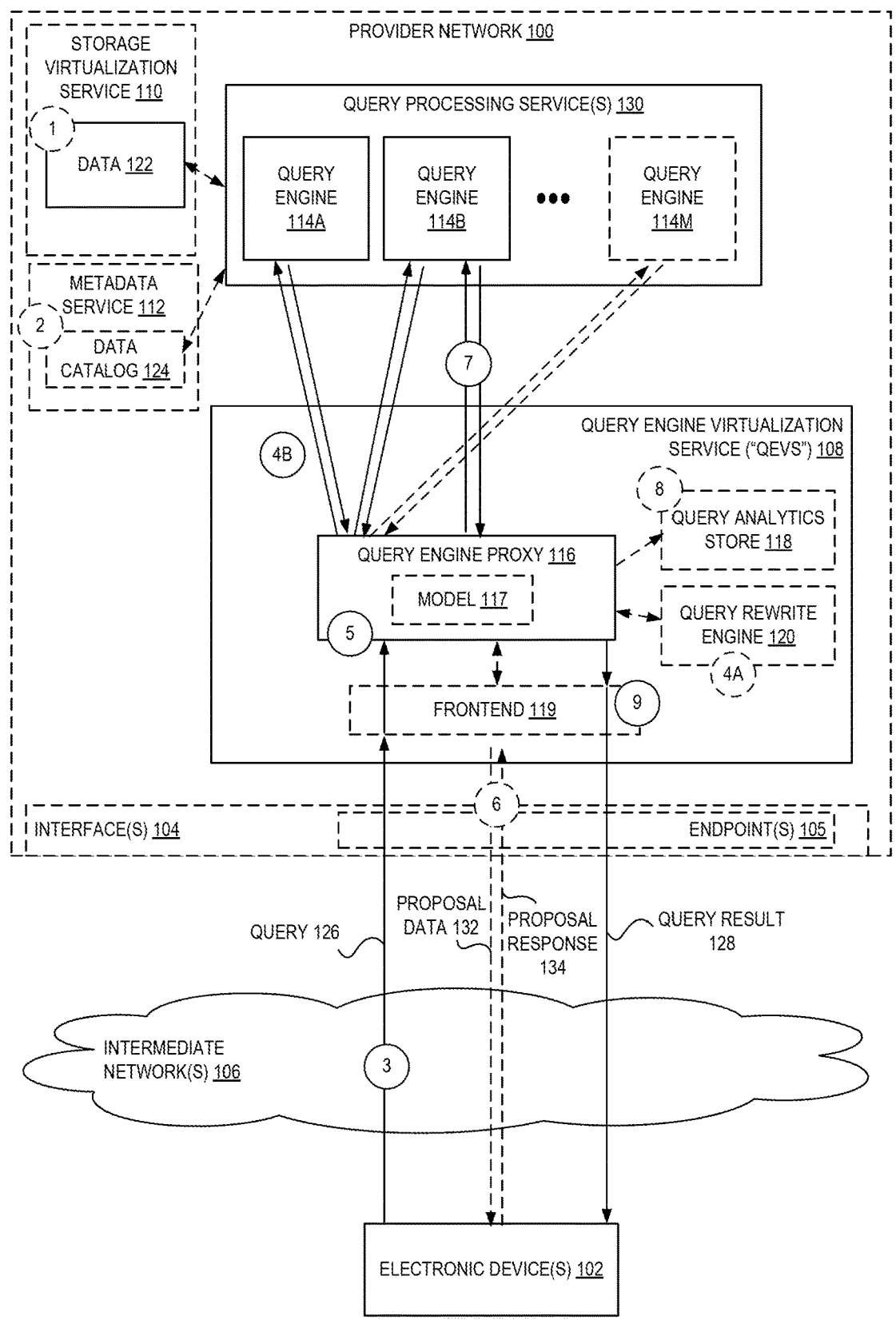
FIG. 1 is a diagram illustrating an environment for query engine virtualization utilizing execution prediction polling according to some embodiments.

FIG. 1 is a diagram illustrating an environment for query engine virtualization utilizing execution prediction polling according to some embodiments. Multiple query processing services 130 may be offered by a provider network 100.

A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage virtualization service 110 that can store data 122 objects, query processing services 130, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s) 104, such as through use of application programming interface (API) calls, via a console implemented as a website or application, etc. The interface(s) 104 may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As indicated above, a provider network 100 may provide multiple different query processing services 130, which may be used for a variety of processing tasks. However, some query processing services 130 may be better suited to executing particular types of queries, operating upon different types, sizes, locations of data 122, performing particular workloads, etc.

In contrast to traditional databases where data, metadata, and processing/compute logic are tightly-coupled (e.g., all part of a same computing system and each designed to be usable only with its "peer" components), many modern query processing services 130 de-couple the underlying data storage from the compute layer, and may also decouple the data catalog 124 (e.g., metadata describing locations, types, etc., of the data 122, which could be provided by a metadata service 112 and utilized by the compute layer for query processing) from the data 122 storage (e.g., which could be maintained in a storage virtualization service 110) and/or compute layer (e.g., a query engine 114A).

With data 122 and data catalogs 124 being decoupled from the query engines 114A-114M, it may thus be possible for multiple types of query engines 114A-114M to execute a particular query using the data 122 and data catalogs 124. Thus, a user seeking to execute a query must determine which query engine 114—of potentially many different query engines 114A-114M—to use. This is tremendously difficult, as users must have a thorough understanding of which different types of use cases—e.g., types, amounts, locations, characteristics of data 122, as well as the type of query, operations required by the query, what query language the query is constructed in, etc. —are handled best by which types of query engines 114A-114M. Further, even if some hypothetical user has this knowledge, the user may still not have insight into any potential availability or performance issues of the various query engines 114A-114M, and thus a more "optimal" query engine for a particular use case may be a sub-optimal choice due to other query engines having more availability or performance/resources available than the optimal query engine.

Accordingly, embodiments described herein provide a virtualization layer in the form of a query engine virtualization service 108 in front of (or "on top of") query processing services 130 such that when a user issues a query, given that the data catalog 124 and the data 122 is already decoupled and its location is known, the compute layer (or query engine) can be virtualized to the extent that a query engine proxy 116 can analyze the query and decide (e.g., based on heuristics, a machine learning model, synchronous feedback, etc.) what is the "best" query engine 114 to issue the query to in order to provide the best query performance for the user.

As shown in FIG. 1, a user (e.g., via one or more electronic devices 102) may seek to utilize query processing services 130 of a provider network 100 to query a set of data 122. As introduced earlier, a query engine virtualization service 108 (or "QEVS") can be implemented "in front of" a plurality of different query processing services 130 having a plurality of different query engines 114A-114M, ones of which may be of a same type or of different types. In some embodiments, the query engines 114A-114M are used only by a particular user (or group of users, such as employees of a common organization) and may thus be "isolated." In some embodiments with isolated query engines 114, the query engines 114 may be automatically "scaled" (e.g., additional query engine instances launched and/or shut down) depending upon the current or expected load placed on ones of the query engines.

The QEVS 108 includes a query engine proxy 116 and optionally a query analytics store 118 and query rewrite engine 120. Each of the query engine proxy 116, query analytics store 118, and query rewrite engine 120 can be implemented as software, hardware, or a combination of both. The query engine proxy 116 operates as a proxy in that it can act like a query engine (or as a "server") from the perspective of a requesting user/client (e.g., it receives query requests and sends back query responses), though the query engine proxy 116 may instead act as a client and issue queries to the query engines 114A-114M and receive query responses from the query engines 114A-114M.

The data 122 to be queried upon may be stored in a storage virtualization service 110 location (e.g., by the user, by another user) at optional circle (1), though in other embodiments the data 122 may be stored in other locations, stored by other users, stored external to the provider network 100, etc. The data 122 may be "distributed" data in that it is stored at different storage locations—e.g., at different filesystem locations, on different volumes, on different physical storage devices, on different electronic devices, in different buildings or geographic locations, etc.

The user may create or update a data catalog 124 (e.g., at optional circle (2)) to reflect the data 122. For example, in some embodiments the data catalog 124 is managed/created by a metadata service 112, e.g., a managed extract, transform, and load (ETL) service that can "discover" and analyze data 122 and store the associated metadata such as table definitions, schemas, data distributions, data storage locations, etc. in a data catalog 124, allowing the data to be searchable or queryable by a query engine 114.

With a set of data 122 (and optionally a data catalog 124), a client may wish to execute a query against the data 122. For example, a user may utilize an electronic device 102 such as a personal computer, mobile device, server computing device, etc., to cause the electronic device 102 to send a query 126 (e.g., as part of a message indicating a request to execute the query) to an endpoint 105 and thereafter the QEVS 108 at circle (3). As one example, the query 126 may be an Application Programming Interface (API) call carried by one or more HyperText Transfer Protocol (HTTP) GET or POST request messages destined to an endpoint of a provider network 100 associated with a frontend 119 of the QEVS 108. As another example, the client may be issuing commands/requests using a JDBC (Java Database Connectivity), ODBC (Open Database Connectivity), or other SQL interface, etc., to a corresponding endpoint 105 (e.g., a JDBC/ODBC endpoint) to execute a query, which may or may not involve a frontend 119.

The query 126 may include the query (e.g., a SQL query) or identify the query or a location at which the query is stored. In some embodiments, the query 126 may also include an identifier of a preferred query engine for use, which can be used to weight the selection of a query engine by the query engine proxy 116 based on that hint. Thus, a "preferred" query engine may be selected over another query engine that might have a slight performance advantage, although the preferred query engine may not be selected over another query engine that has a substantial performance advantage (e.g., as defined by a threshold difference).

As indicated above, the query engine proxy 116 can cause the query to be executed in a variety of ways. As shown in FIG. 1, in some embodiments the query engine proxy 116 sends the query (or data based on the query) at circle (4B) to multiple ones (some or all) of the query engines 114A-114M. For example, the query (and optionally, other information such as a user identifier, etc.) may be sent as part of a request (e.g., a "GetExecutionEstimate" request) to obtain predicted query execution characteristics from each of the recipient query engines 114A-114M.

In some embodiments, the query engine proxy 116 may detect a format of the query (e.g., which version or versions of a query language the query adheres to), and based on knowledge of what query language versions are supported by the query engines 114A-114M, may determine whether the query needs to be "rewritten" according to a different query language standard for particular query engines. For example, at circle (4A) the query engine proxy 116 may utilize a query rewrite engine 120 to re-write a query in a different query form for one or more of the query engines 114, and such rewritten queries may be provided to the ones of the query engines needing those rewritten versions to be able to execute the query.

Each recipient query engine 114 may analyze the query (e.g., generate an execution plan) and optionally analyze the data catalog 124 and data 122 to determine one or more predicted performance characteristics resulting if that query engine would actually execute the query. For example, recipient query engine 114 may determine predicted performance characteristics such as a predicted amount of time to execute the query (e.g., based on one or more of determining what operations it would be required to perform—such as selections, projections, joins, etc.; determining what data, how much data, and in what different locations would need to be scanned; etc.), a predicted cost associated with executing the query, one or more predicted "heaviest" operations needed to be performed to execute the query, etc. Thus, one or more predicted performance characteristics can be determined by each recipient query engine 114 and returned in a response to the request (e.g., in a GetExecutionEstimate response message) to the query engine proxy 116.

At circle (5), the query engine proxy 116 can analyze the returned predicted performance characteristics to determine a "best" query engine to actually execute the query. The query engine proxy 116 may rely on a set of heuristics defined or selected by the implementer (or user) based on particular preferences—e.g., a "best" query may be the one that is likely to execute the fastest, and thus the query engine proxy 116 may identify a minimum predicted execution time from among the responses from the query engines, and select the query engine that sent that response as the desired query engine for execution. Of course, other heuristics can be used, which can be based on one or multiple factors, such as predicted performance characteristics (e.g., a minimum expected cost, a minimum score based on weighted predicted execution times and weighted expected costs, etc.) or other factors (e.g., time of day, anticipated or actual load on the query engines or related services, characteristics/distributions of data and/or storage locations of data 122), etc.

In some embodiments, the selection of the query engine by the query engine proxy 116 may be based on use of a model 117 such as a statistical model or machine learning (ML) model. Such a model may be manually constructed or tuned by an implementer, or trained (on a one-time, continual, or recurring basis) using predicted performance characteristic values or actual observed characteristic values, etc., which may be obtained via a query analytics store 118. In some embodiments, the model 117 is a machine learning model (or statistical model) that is trained specific to a particular customer/user (or group of customers/users), and thus may be able to weight its selections according to prior customer (or similar customer) activity. Accordingly, for a particular query, one or more features can be obtained based on the query and/or other environmental factors (e.g., which customer or type of customer requested the query to be executed, operational loads placed upon the query engines, etc.) and provided to the model 117 to result in the model 117 identifying a "best" query engine for the query.

As another example, the query engine proxy 116 may use a set of heuristics to select a query engine, and these heuristics may be weighted based on the predicted performance characteristics returned at (4B). In some embodiments, the query engine proxy 116 may also remove (or downgrade) certain ones of the query engines 114A-114M from being selected based on whether query rewriting needs to be performed or even can be performed.

In some embodiments, a frontend 119 of the QEVS 108 may identify a "preferred" query engine via soliciting feedback from a user (e.g., the original query-submitting user). The frontend 119 may be a software module such as a web server application, though in some embodiments it can be implemented as hardware or as a combination of hardware and software. As shown at optional circle (6), the frontend 119 may send a message (e.g., an HTTP message) with proposal data 132 (e.g., in response to query 126, in response to another request issued by the electronic device 102, etc.) identifying one or more query engine options and predicted performance characteristics of those query engine options (e.g., received by the query engine proxy 116 at circle (4B) via GetExecutionEstimate response messages, and thereafter provided to or otherwise made accessible to the frontend 119). Thus, the frontend 119 may indicate what the likely performance characteristics of the various query engines would be, and may suggest one (or multiple) ones of the query engines to be used. In some embodiments, the user may choose one of the query engines (e.g., by selecting an option using a graphical user interface (GUI) input element such as a radio button, checkbox, drop-down menu, or the like) and cause the electronic device 102 (e.g., via selecting a button or changing a user interface input element value) to send a proposal response 134 message to the frontend 119 (e.g., an HTTP GET or PUT request message) indicating a request to execute the query using a user-selected query engine, which may or may not be one that was "recommended" to the user as having a best performance characteristic. One exemplary GUI that can be used for these and similar purposes is provided later herein with regard to FIG. 5.

Regardless of the technique utilized to select a query engine, at circle (7) the query engine proxy 116 can send the query (or, data based on the query such as a rewritten query) to the selected query engine (here, query engine 114B). The query engine 114B will then execute the query against the data 122 (optionally via use of a data catalog 124), and return a query result to the query engine proxy 116.

In some embodiments, the query engine proxy 116 may store the query and/or metadata regarding the execution of the query (e.g., a time to completion, an actual cost, which query engine executed the query, etc.) in a query analytics store 118 at optional circle (8). This data can be used thereafter, e.g., to retrain or regenerate the model 117 based on updated actual performance data to improve subsequent query engine selection by the query engine proxy 116.

At circle (9), the query engine proxy 116 sends a message including a query result 128 to the electronic device 102 that includes the query result the query engine proxy 116 received from the query engine 114B.

Figure 2:
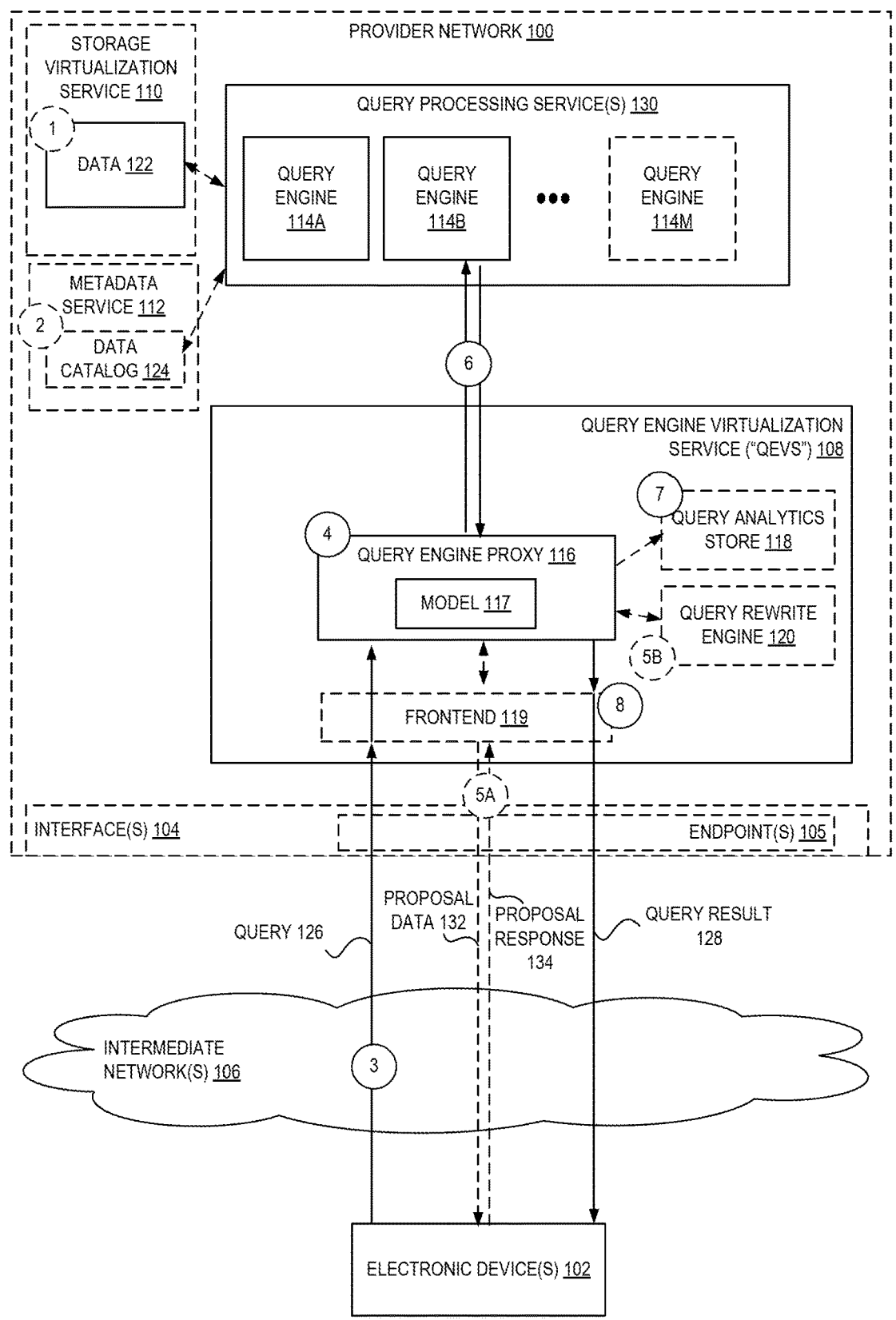
FIG. 2 is a diagram illustrating an environment for query engine virtualization utilizing a query engine selection model according to some embodiments.

As indicated above, in various embodiments the query engine proxy 116 can select a query engine to perform query execution in a variety of ways. As another example, FIG. 2 is a diagram illustrating an environment for query engine virtualization utilizing a query engine selection model 117 according to some embodiments. In this example, upon receipt of a query 126 to execute a query, the query engine proxy 116 can at circle (4) simply run the model 117 using the necessary input features to select a "best" query engine. This configuration can be particularly beneficial with a mature or stable model 117, in that it does not involve sending GetExecutionEstimate request messages to the query engines 114A-114M and waiting for responses, which is both time consuming and requires the query engines 114A-114M to perform processing/analysis to determine the predicted performance characteristics for the query. Thereafter, the query engine proxy 116 may optionally provide recommendations to solicit a desired query engine by sending proposal data 132 and receiving a proposal response 134 as described earlier with regard to FIG. 1, though in some embodiments the query engine proxy 116 may simply call a "best" query engine (as determined based on the outputs of the model 117) without such user input at circle (6) (with the original query or a rewritten query from circle (5B)), optionally store analytics data at circle (7), and return the query result at circle (8).

Accordingly, in some embodiments this model-based selection can be used in a second phase after an earlier phase using the GetExecutionEstimate "polling" shown in FIG. 1, which allows for a model 117 to be trained.

Figure 3:
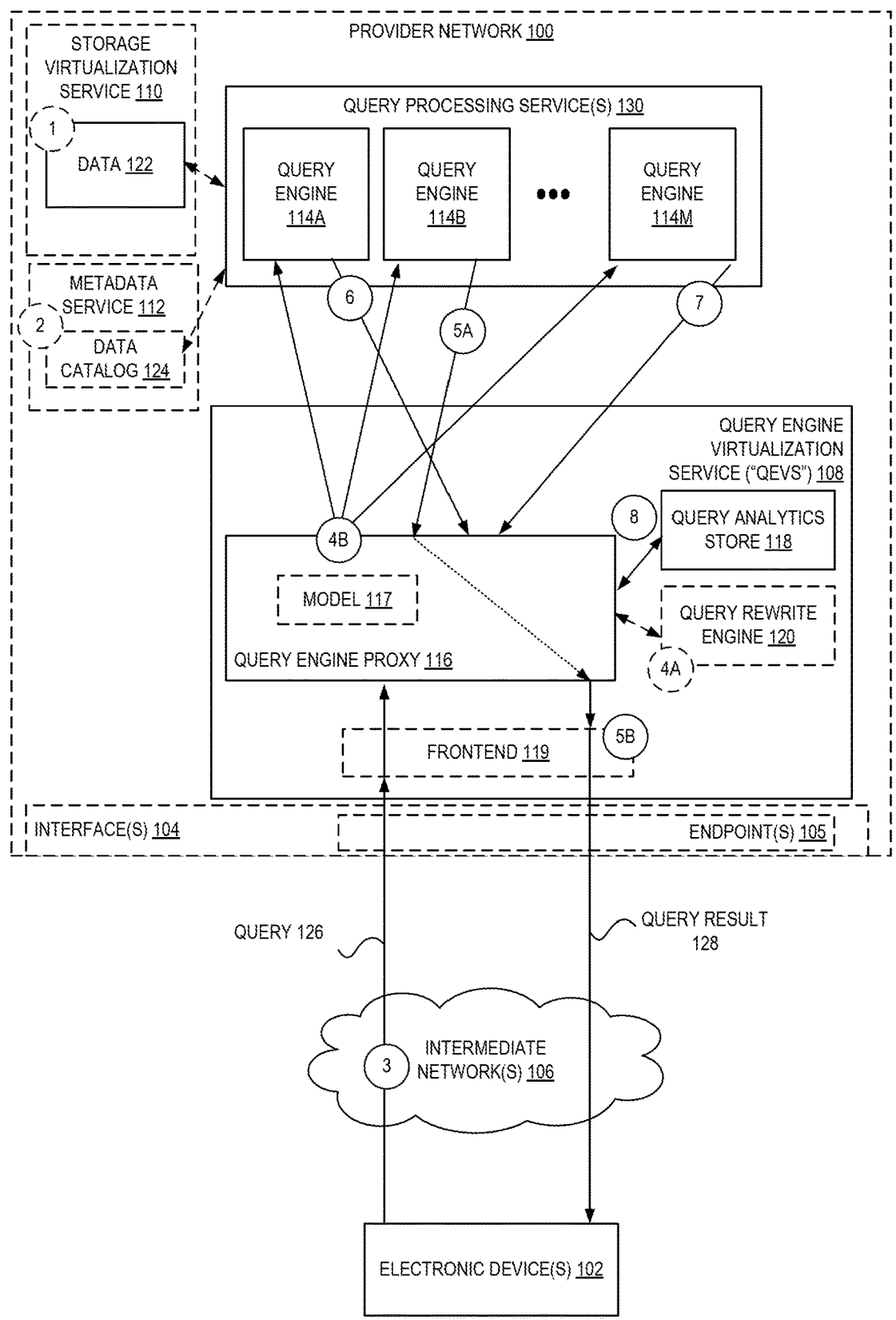
FIG. 3 is a diagram illustrating an environment for query engine virtualization utilizing first response processing according to some embodiments.

Another example for query engine selection is shown in FIG. 3, which is a diagram illustrating an environment for query engine virtualization utilizing first response processing according to some embodiments. Similar to the GetExecutionEstimate "polling", in this example the query engine proxy 116 may interact with multiple query engines 114A-114M. However, in this figure, after receipt of a query 126 to execute a query at circle (3), the query engine proxy 116 may transmit actual requests to execute the query (identifying the query, or a rewritten version of the query, as needed, generated at optional circle (4A)) to multiple ones of the query engines 114A-114M at circle (4B).

In this example, the multiple query engines 114A-114M each execute the query. Upon each engine completing its execution, it will send a response message back to the query engine proxy 116 including the query result. For example, as shown, query engine 114B may complete its processing first and at circle (5A) return its query result. In this case, the query engine proxy 116 may return this "first" query result at circle (5B) in a message carrying a query result 128. Thereafter, the other query engines 114A-114M may return the results of their query processing, such as at circles (6) and (7). These query results are not returned by the query engine proxy 116; however, the query engine proxy 116 may store data based on any/all of the query results (obtained at circles (5A), (6), (7), etc.) and/or the query itself at circle (8) in the query analytics store 118, which can be used to further train/develop the model 117. This approach can be particularly beneficial to build a knowledgebase of query performance for the multiple query engines 114A-114M, and could be used in an initial phase of system deployment before switching to another phase (e.g., the GetExecutionEstimate "polling" of FIG. 1 or the "direct" selection of FIG. 2) that is not quite as resource intensive in terms of the query engines 114A-114M. However, in other embodiments, the query engine proxy 116 may not return the first received query result, but could return some other one result or multiple ones of the results.

For further detail regarding the GetExecutionEstimate request and response messages, we turn to FIG. 4, which is a diagram illustrating exemplary GetExecutionEstimate request 400 and response 450 formats according to some embodiments. The GetExecutionEstimate request 400 shown includes three fields, though in other embodiments more, fewer, and/or different types of fields can be utilized. The three fields include an identifier ("id") field having an identifier of the request, a customer identifier ("customer id") of the customer issuing the request to perform the query (e.g., to assist in locating the data or data catalog), and the actual query.

Figure 5:
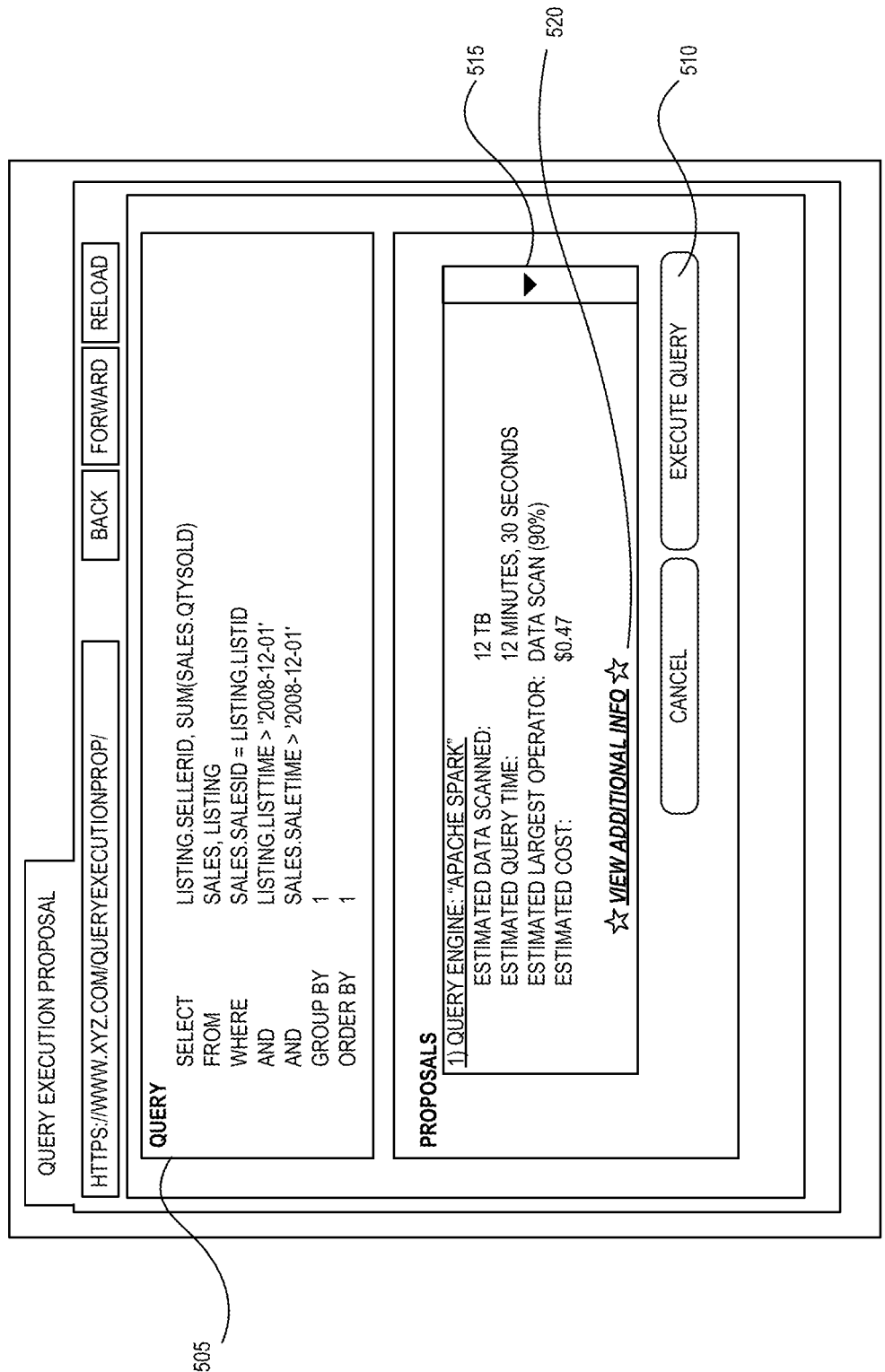
FIG. 5 is a diagram illustrating an exemplary graphical user interface for providing query engine execution proposals according to some embodiments.

To solicit user input as to what query engine to select (as described in the earlier figures), embodiments can predict performance characteristics of one or more query engines for a particular query to the user. This can be performed via a graphical user interface (GUI) such as a web page, etc. For example, FIG. 5 is a diagram illustrating an exemplary GUI for providing query engine execution proposals according to some embodiments. This exemplary GUI is shown as a web page within a web browser window, however it is to be understood that this information can be displayed in a variety of other contexts using different applications and interfaces, and thus this example is illustrative of just one possibility. In this example, the submitted query 505 is shown in a top user interface element, and one or multiple query engine execution proposals are shown in another user interface element 515. In this case, a first query engine (here, "Apache Spark") is shown as a recommended query engine, along with multiple predicted performance characteristics for that engine—an estimated amount of data anticipated to be scanned to execute the query, an estimated query time, an estimate of the largest operator or operations required to execute the query (along with an overall percentage of the query processing consumed by that operation—e.g., performing a table scan may require 90% of processing time), an estimated cost. In this example, the query engine (and associated predicted performance characteristics) are shown first to indicate that this engine may provide a best result—e.g., a smallest amount of execution time, a smallest estimated cost, etc. In some embodiments, the user may also view predicted performance characteristics of other query engines—in this example, the user may select a drop-down user interface element 515 (represented as a downward facing arrow) to view one or more other options. The user may then select a preferred query engine, and by selecting another user interface element 510—here, a button that reads "execute query"—cause another message including a proposal response 134 to be sent to the QEVS 108 to execute the query using the user-selected query engine.

In some embodiments, a user may view additional in-depth information regarding ones of the query engine proposals. By selecting a user interface input element 520 (e.g., clicking a hyperlink such as "View Additional Info"), the user interface may be updated to present additional information generated by the corresponding query engine that pertains to the anticipated execution of the query. For example, a user may be presented with a full list of operations/operators that would be performed by the query engine to execute the query, an anticipated query execution plan (e.g., in XML format), etc., allowing the user to have even more visibility into how a query may be executed, which could impact their choice of query engine, or allow the user to reformulate their query (e.g., for resubmission) to attempt to improve the performance of the query.

Figure 6:
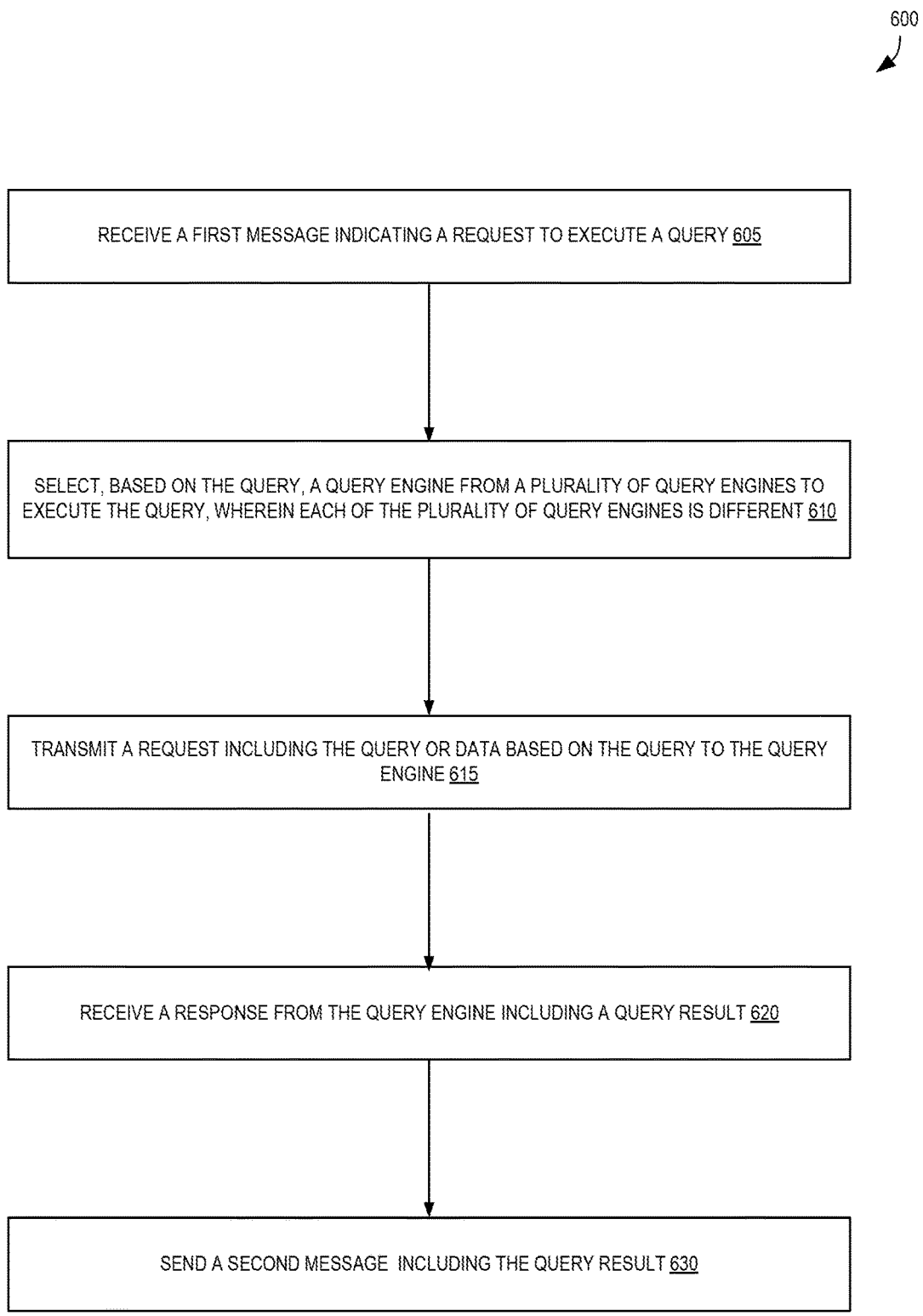
FIG. 6 is a flow diagram illustrating operations of a method for query engine virtualization according to some embodiments.

FIG. 6 is a flow diagram illustrating operations 600 of a method for query engine virtualization according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the QEVS 108 or query engine proxy 116 of the other figures.

The operations 600 include, at block 605, receiving a first message indicating a request to execute a query. The request may be initially received at an endpoint of a service provider network and thereafter be provided to the QEVS 108. In some embodiments, the request is an HTTP request message, while in other embodiments the request is sent using another protocol. The first request may have been originated by an electronic device of a user that is located outside of the service provider network. The first message may include the query or an identifier of a location of a query.

The operations 600 also include, at block 610, selecting, based on the query, a query engine from a plurality of query engines to execute the query, wherein each of the plurality of query engines is different. The selecting may be based on a set of heuristics, the running of a machine learning model, received GetExecutionEstimate response messages carrying predicted performance characteristics generated by the query engines based on the query, and/or a preference of a user provided after providing one or more recommendations to the user. Block 610 may include a variety of types of operations depending on the environment and/or embodiment.

Figure 7:
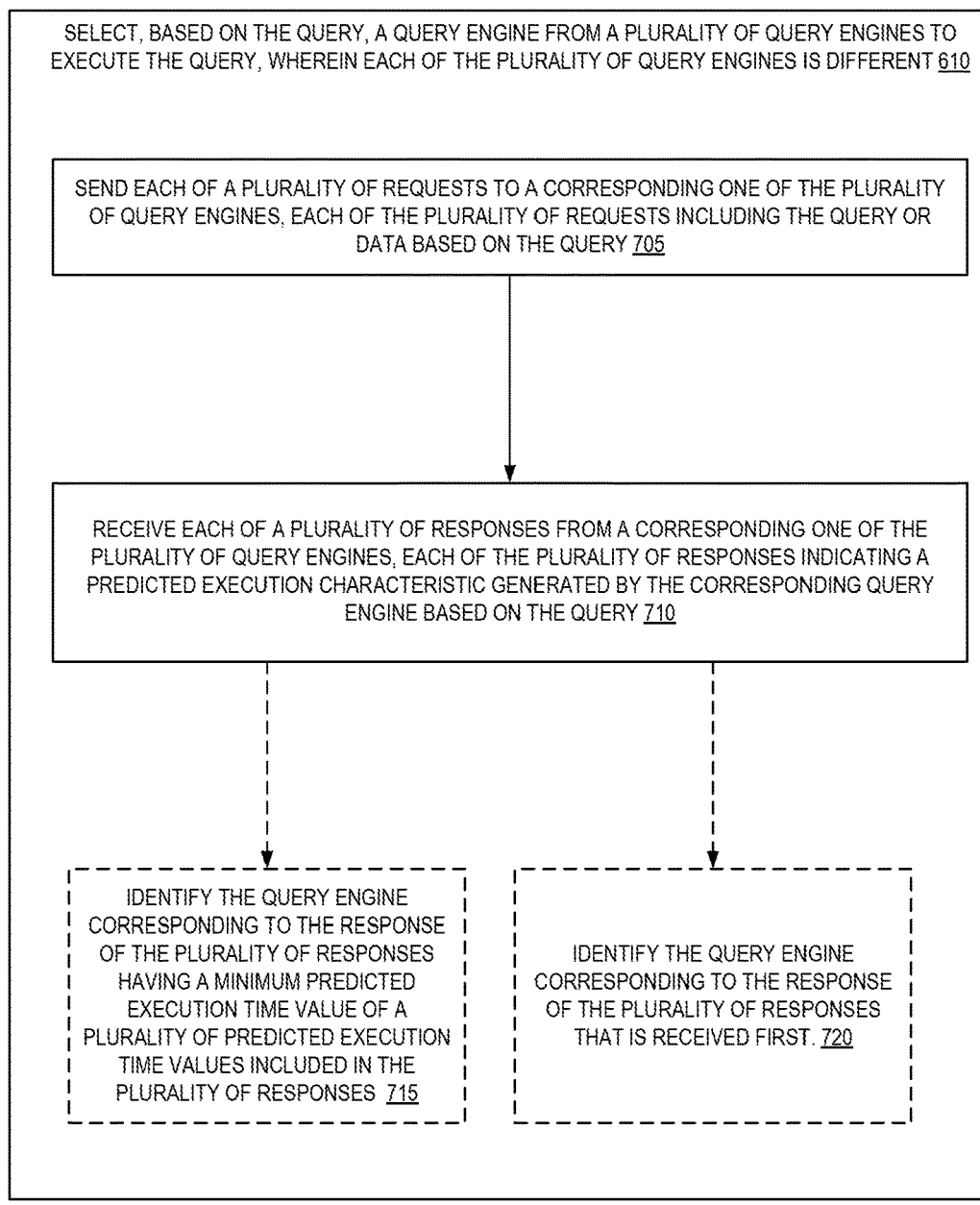
FIG. 7 is a flow diagram illustrating operations of methods for query engine selection according to some embodiments.

For further detail, we turn ahead to FIG. 7, which is a flow diagram illustrating operations 700 of methods for query engine selection according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by the QEVS 108 or query engine proxy 116 of the other figures.

The operations 700 include, at block 705, sending each of a plurality of requests to a corresponding one of the plurality of query engines, each of the plurality of requests including the query or data based on the query (e.g., a rewritten query using another version/type/standard of a query language that can be processed by the particular recipient query engine).

The operations 700 also include, at block 710, receiving each of a plurality of responses from a corresponding one of the plurality of query engines. Each of the plurality of responses indicates a predicted execution characteristic generated by the corresponding query engine based on the query. The predicted execution characteristic may be a predicted execution time for the query, a predicted cost to execute the query, one or more comparatively resource-heavy operations anticipated to be part of executing the query, an amount of data that needs to be scanned to execute the query, etc.

In some embodiments, the operations 700 further include, at block 715, identifying the query engine corresponding to the response of the plurality of responses having a minimum predicted execution time value of a plurality of predicted execution time values included in the plurality of responses. In other embodiments, one or more returned predicated execution characteristics (e.g., predicted execution time, predicted cost, etc.) can be used as inputs to a statistical or ML model to identify a "best" query engine.

However, in other embodiments, the operations 700 include, at block 720, identifying the query engine corresponding to the response of the plurality of responses that is received first.

Turning back to FIG. 6, the operations 600 include, at block 615, transmitting a request including the query or data based on the query (e.g., a rewritten query) to the query engine, which indicates a request to execute the query. The operations 600 also include, at block 620, receiving a response from the query engine including a query result, and at block 630, sending a second message including the query result (e.g., to an electronic device of a user, such as the electronic device that submit the request that was received at block 605).

Figure 8:
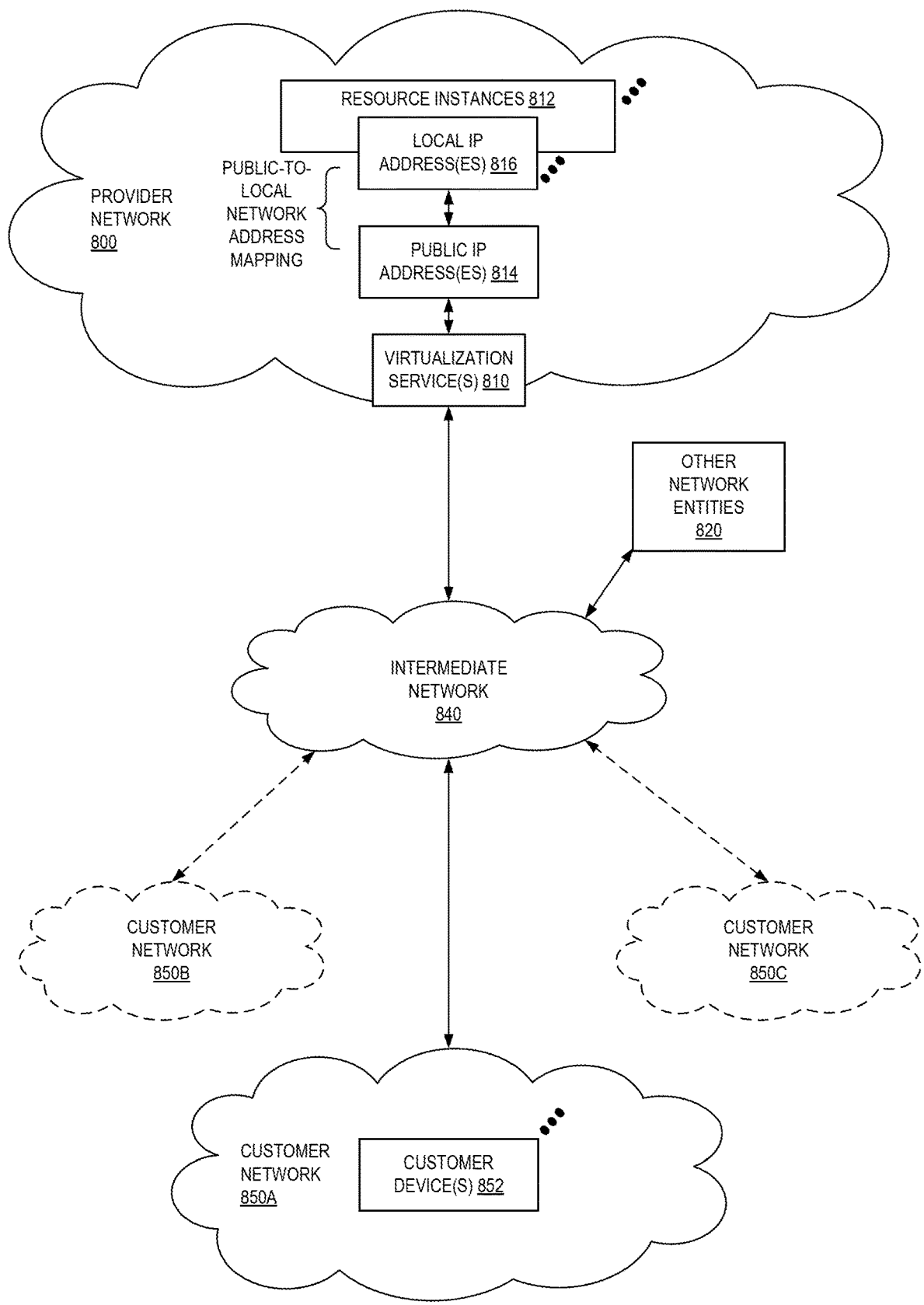
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
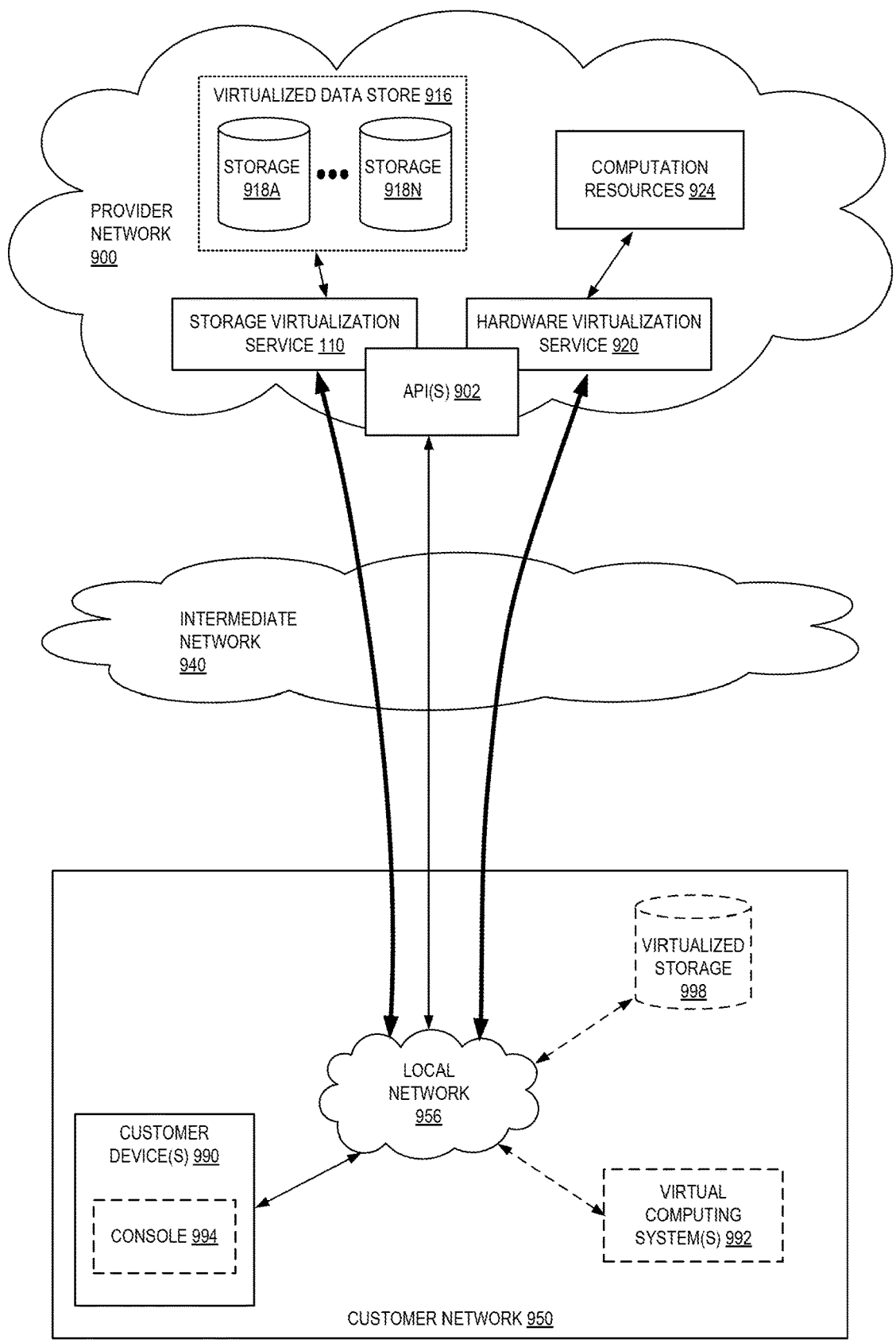
FIG. 9 is a block diagram of an example provider network that provides a storage virtualization service and a hardware virtualization service to customers according to some embodiments.

FIG. 9 is a block diagram of an example provider network that provides a storage virtualization service 110 and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage virtualization service 110, for example via one or more APIs 902, to access data from and store data to storage resources 918A-918N of a virtual data store 916 provided by the provider network 900. In some embodiments, a virtualized data store gateway (not shown) may be provided at the customer network 950 that may locally cache at least some data, for example frequently accessed or critical data, and that may communicate with virtualized data store service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes, which appear to the user as local virtualized storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative System

Figure 10:
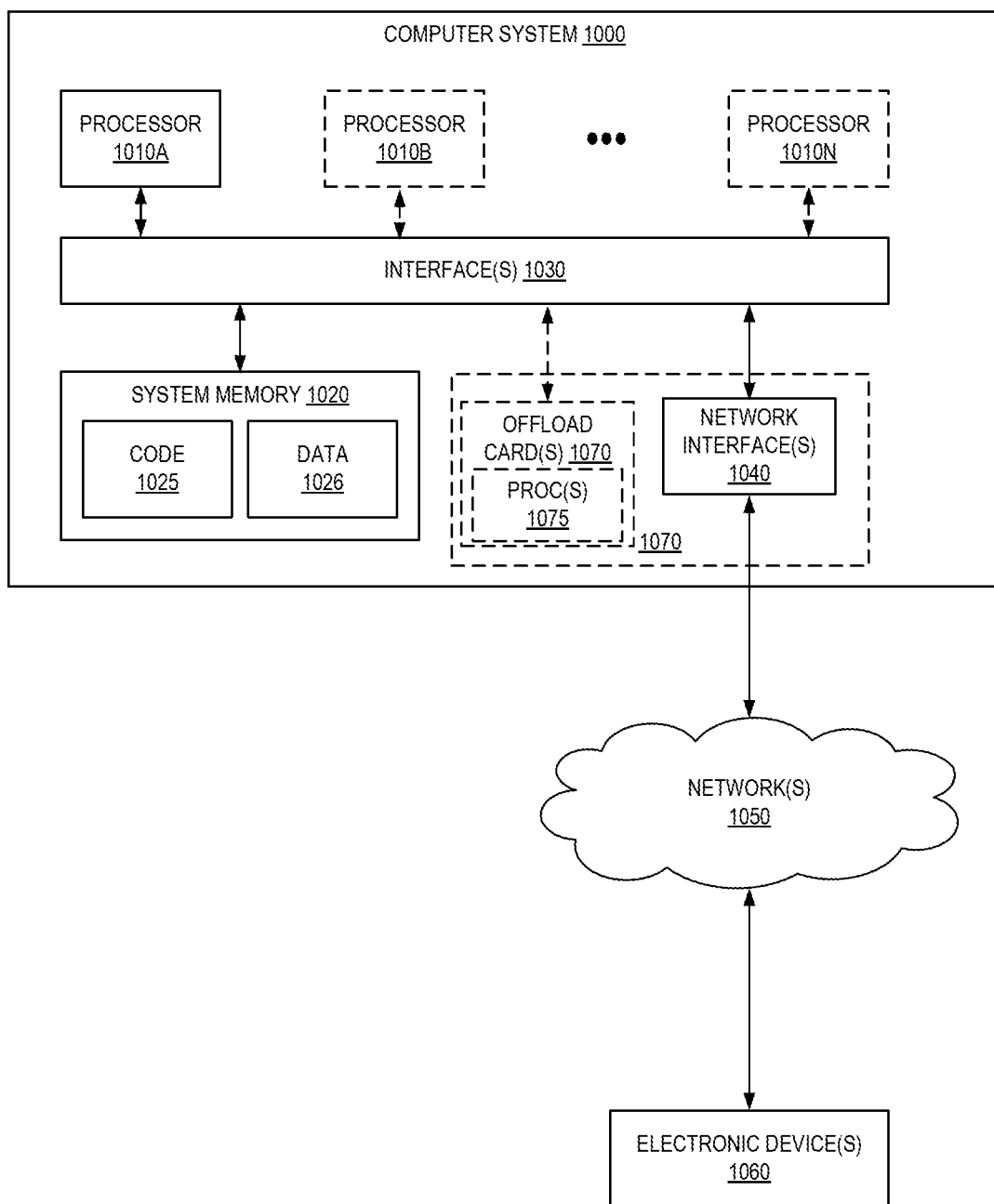
FIG. 10 is a block diagram illustrating an example computer system that may be used in some embodiments.

In some embodiments, a system that implements a portion or all of the techniques for query engine virtualization described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Figure 11:
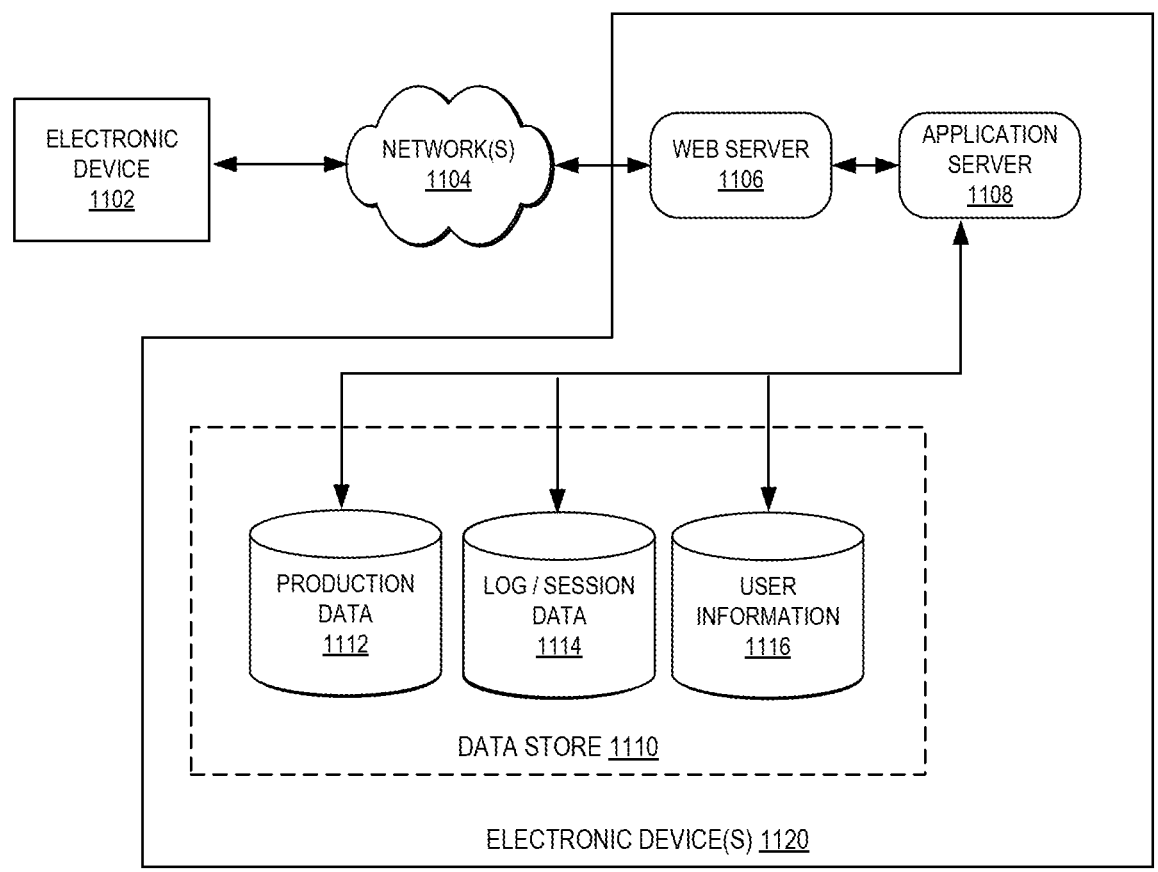
FIG. 11 illustrates an example of an environment for implementing aspects in accordance with various embodiments.

As discussed, different approaches can be implemented in various environments in accordance with the described embodiments. For example, FIG. 11 illustrates an example of an environment 1100 for implementing aspects in accordance with various embodiments. For example, in some embodiments the requests to execute queries and/or GetExecutionEstimate requests are HyperText Transfer Protocol (HTTP) requests that are received by a web server (e.g., web server 1106), and the users, via electronic devices, may interact with the provider network via a web portal provided via the web server 1106 and application server 1108. As will be appreciated, although a web-based environment is used for purposes of explanation, different environments may be used, as appropriate, to implement various embodiments. The system includes an electronic client device 1102, which may also be referred to as a client device and can be any appropriate device operable to send and receive requests, messages or information over an appropriate network 1104 and convey information back to a user of the device 1102. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1104 includes the Internet, as the environment includes a web server 1106 for receiving requests and serving content in response thereto, although for other networks an alternative device serving a similar purpose could be used, as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device 1102 and handling a majority of the data access and business logic for an application. The application server 1108 provides access control services in cooperation with the data store 1110 and is able to generate content such as text, graphics, audio, video, etc., to be transferred to the client device 1102, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1102 and the application server 1108, can be handled by the web server 1106. It should be understood that the web server 1106 and application server 1108 are not required and are merely example components, as structured code discussed herein can be executed on any appropriate device or host machine as discussed elsewhere herein.

The data store 1110 can include several separate data tables, databases, or other data storage mechanisms and media for storing data relating to a particular aspect. For example, the data store illustrated includes mechanisms for storing production data 1112 and user information 1116, which can be used to serve content for the production side. The data store 1110 also is shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. In one example, a user might submit a search request for a certain type of item. In this case, the data store 1110 might access the user information 1116 to verify the identity of the user and can access a production data 1112 to obtain information about items of that type. The information can then be returned to the user, such as in a listing of results on a web page that the user is able to view via a browser on the user device 1102. Information for a particular item of interest can be viewed in a dedicated page or window of the browser.

The web server 1106, application server 1108, and/or data store 1110 may be implemented by one or more electronic devices 1120, which can also be referred to as electronic server devices or server end stations, and may or may not be located in different geographic locations. Each of the one or more electronic devices 1120 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 114A-114M) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at an endpoint of a service provider network, a first message originated by an electronic device of a user indicating a request to execute a query against a set of data;
   sending a plurality of requests to a corresponding plurality of query engines implemented within the service provider network, each of the plurality of requests including the query or a rewritten query based on the query;
   receiving a plurality of responses from the corresponding plurality of query engines, each of the plurality of responses indicating a predicted execution characteristic generated by the corresponding query engine based on the query or the rewritten query;
   selecting, based on the plurality of responses, a query engine from the plurality of query engines having a best predicted performance characteristic to execute the query or the rewritten query;
   transmitting a second message to the query engine to execute the query or the rewritten query;
   receiving a third message from the query engine including a query result; and
   sending a fourth message including the query result to the electronic device.

2. The computer-implemented method of claim 1, wherein selecting the query engine based on the plurality of responses comprises:
   identifying a minimum predicted execution time value from a plurality of predicted execution time values received in the plurality of responses, wherein the response of the plurality of responses sent by the selected query engine includes the minimum predicted execution time value.

3. The computer-implemented method of claim 2, further comprising:
   transmitting a fifth message destined to an electronic device of a user, the fifth message identifying at least the query engine and the minimum predicted execution time; and
   receiving a sixth message originated by the electronic device indicating that the query or the rewritten query is to be executed using the query engine.

4. A computer-implemented method comprising:
   receiving a first message indicating a request to execute a query against a set of data;
   sending requests to a plurality of query engines, each of the requests including the query;
   receiving a plurality of responses from the plurality of query engines, the responses indicating predicted performance characteristics generated by the plurality of query engines based on the query;
   selecting, based at least in part on the responses, a query engine from the plurality of query engines having a best predicted performance characteristic corresponding to a workload needed to execute the query;
   transmitting a second message to the query engine, the second message including the query;
   receiving a third message from the query engine that includes a query result; and
   sending a fourth message including the query result.

5. The computer-implemented method of claim 4, wherein the fourth message is sent to a device from which the first message originated.

6. The computer-implemented method of claim 4, wherein the first message is received at a query engine proxy of a query engine virtualization service implemented within a service provider network.

7. The computer-implemented method of claim 4, wherein each of the predicted performance characteristics comprises a predicted execution time value, and wherein selecting the query engine from the plurality of query engines further comprises:
   identifying the query engine from the plurality of query engines corresponding to the response of the plurality of responses having a minimum predicted execution time value of the plurality of predicted execution time values included in the plurality of responses.

8. The computer-implemented method of claim 7, wherein selecting the query engine from the plurality of query engines further comprises:
   transmitting a fifth message destined to an electronic device of a user, the fifth message identifying at least the query engine and the minimum predicted execution time; and
   receiving a sixth message originated by the electronic device indicating a request to execute the query using the query engine.

9. The computer-implemented method of claim 4, wherein selecting the query engine from the plurality of query engines comprises:
- determining that the third message was received prior to receipt of any other message from any other query engine that includes a query result; and
- identifying the query engine corresponding to the third message.

10. The computer-implemented method of claim 4, wherein at least one of the predicted performance characteristics of the plurality of responses is one of:
- a predicted execution time;
- a predicted amount of data to be scanned to execute the query;
- one or more operations to be performed as part of executing the query that have a highest resource cost; or
- a predicted cost to execute the query.

11. The computer-implemented method of claim 4, wherein selecting the query engine from the plurality of query engines comprises:
- running a model, based at least on either the query or an identifier of an account associated with the first request, to identify the query engine.

12. The computer-implemented method of claim 4, further comprising:
- generating a rewritten query based on the query, wherein the rewritten query is compliant with a first query language definition, the query is compliant with a second query language definition, and the query and the rewritten query are both equivalent,
- wherein the second message comprises the rewritten query.

13. The computer-implemented method of claim 4, wherein:
- the first message is received at an endpoint of a service provider network; and
- each of the plurality of query engines is implemented within the service provider network.

14. The computer-implemented method of claim 4, wherein the query involves data stored in a distributed manner at a plurality of different storage locations.

15. The computer-implemented method of claim 4, wherein at least one of the plurality of query engines is a data warehouse service, an interactive query service, or a distributed processing service.

16. A system comprising:
- a plurality of query engines implemented by a first one or more electronic devices having at least a first processor coupled to first memory; and
- a query engine virtualization service implemented by a second one or more electronic devices having at least a second processor coupled to second memory, the query engine virtualization service including instructions stored in the second memory that upon execution by the at least a second processor cause the query engine virtualization service to:
  - receive a request to execute a query against a set of data;
  - send requests to the plurality of query engines, each of the requests including the query;
  - receive responses from the plurality of query engines, the responses indicating predicted performance characteristics generated by the plurality of query engines based on the query;
  - select, based on a query the responses, a query engine from the plurality of query engines that has a best predicted performance characteristic corresponding to a workload needed to execute the query;
  - transmit a first message to the query engine, the first message indicating the request to execute the query or a rewritten query generated based on the query;
  - receive a second message from the query engine including a query result; and
  - send a third message including the query result.

17. The system of claim 16, wherein to select the query engine, the query engine virtualization service includes further instructions stored in the second memory that upon execution by the at least a second processor further cause the query engine virtualization service to:
- identify a minimum predicted execution time value from a plurality of predicted execution time values corresponding to the plurality of query engines, wherein each of the plurality of predicted execution time values was generated by the corresponding query engine based on the query.

18. The system of claim 17, wherein at least one of the plurality of query engines is a data warehouse service, an interactive query service, or a distributed processing service.

19. The system of claim 16, wherein the query engine virtualization service includes further instructions stored in the second memory that upon execution by the at least a second processor further cause the query engine virtualization service to:
- generate a rewritten query based on the query, wherein the rewritten query is compliant with a first query language definition, the query is compliant with a second query language definition, and the query and the rewritten query are both equivalent,
- wherein the rewritten query is included in the first message.

20. The system of claim 16, wherein the query engine virtualization service includes further instructions stored in the second memory that upon execution by the at least a second processor further cause the query engine virtualization service to:
- transmit a fourth message destined to an electronic device of a user, the third message identifying at least the query engine and a minimum predicted execution time; and
- receive a fifth message originated by the electronic device indicating a request to execute the query using the query engine.

* * * * *